(12) United States Patent
Xu et al.

(10) Patent No.: US 10,652,492 B1
(45) Date of Patent: May 12, 2020

(54) CMOS IMAGE SENSOR WITH IMPROVED COLUMN DATA SHIFT READOUT

(71) Applicant: SmartSens Technology (Cayman) Co., Limited., Shanghai (CN)

(72) Inventors: Chen Xu, Shanghai (CN); Yaowu Mo, Shanghai (CN); Jinjian Hou, Shanghai (CN); Weijian Ma, Shanghai (CN); Guanjing Ren, Shanghai (CN)

(73) Assignee: SmartSens Technology (Cayman) Co., Ltd., Shanghai (CN)

( * ) Notice: Subject to any disclaimer, the term of this patent is extended or adjusted under 35 U.S.C. 154(b) by 0 days.

(21) Appl. No.: 16/273,457

(22) Filed: Feb. 12, 2019

(51) Int. Cl.
| | | |
|---|---|---|
| *H04N 5/374* | (2011.01) | |
| *H04N 5/372* | (2011.01) | |
| *H04N 5/378* | (2011.01) | |
| *H04N 5/335* | (2011.01) | |
| *H04N 9/04* | (2006.01) | |
| *H04N 5/3745* | (2011.01) | |
| *H04N 5/347* | (2011.01) | |

(52) U.S. Cl.
CPC ........... *H04N 5/3742* (2013.01); *H04N 5/335* (2013.01); *H04N 5/347* (2013.01); *H04N 5/378* (2013.01); *H04N 5/37213* (2013.01); *H04N 5/37455* (2013.01); *H04N 5/37457* (2013.01); *H04N 9/045* (2013.01)

(58) Field of Classification Search
CPC .. H04N 5/3742; H04N 5/378; H04N 5/37455; H04N 5/37213; H04N 5/347; H04N 5/37457; H04N 9/045; H04N 5/335; H01L 27/146
See application file for complete search history.

(56) References Cited

U.S. PATENT DOCUMENTS

| | | | |
|---|---|---|---|
| 6,693,270 B2 * | 2/2004 | Iodice | .................. H04N 3/1575 250/208.1 |
| 6,731,335 B1 | 5/2004 | Kim et al. | |
| 7,167,200 B1 | 1/2007 | Phal et al. | |
| 7,573,519 B2 | 8/2009 | Phan et al. | |
| 9,596,423 B1 | 3/2017 | Molgaard | |
| 9,686,485 B2 | 6/2017 | Agranov et al. | |

(Continued)

OTHER PUBLICATIONS

Yannick De Wit, Tomas Geurts; Title: A Low Noise Low Power Global Shutter CMOS Pixel Having Capability and Good Shutter Efficiency; Date: Unknown; pp. 1-4; Pub: Belgium.

*Primary Examiner* — Abdelaaziz Tissire
(74) *Attorney, Agent, or Firm* — Eric Karich; Karich & Associates (57) ABSTRACT

An imaging sensor having a pixel array with a separate analog-to-digital conversion (ADC) circuit coupled on an input side to each column line and on an output side to a separate M-bit wide digital memory circuit and a column data readout circuit comprising N M-bit data shifters. Each M-bit data shifter has an M-bit wide output, and single pole double throw (SPDT) switches whose common terminals provide inputs to the M-bit data shifters, wherein a first switch state of the SPDT switches connects the input of their associated M-bit data shifters to their associated M-bit wide digital memory circuits and wherein a second switch state of the SPDT switches connects the input of their associated M-bit data shifters to an M-bit wide output bus from an adjacent M-bit data shifter.

10 Claims, 6 Drawing Sheets

(56) References Cited

U.S. PATENT DOCUMENTS

| | | | |
|---|---|---|---|
| 2003/0081134 A1* | 5/2003 | Luo | H04N 5/353 348/308 |
| 2007/0229686 A1* | 10/2007 | Hiyama | H04N 5/3456 348/294 |
| 2009/0115876 A1* | 5/2009 | Totsuka | H04N 5/3692 348/294 |
| 2009/0237535 A1* | 9/2009 | Okumura | H04N 5/355 348/294 |
| 2011/0080625 A1* | 4/2011 | Totsuka | H04N 5/3595 358/482 |
| 2011/0133057 A1 | 6/2011 | Olsen | |
| 2011/0261233 A1* | 10/2011 | Zhang | H04N 5/335 348/241 |
| 2012/0013493 A1* | 1/2012 | Kato | H03M 1/0619 341/120 |
| 2012/0138772 A1* | 6/2012 | Hagihara | H04N 5/37455 250/208.1 |
| 2012/0212657 A1 | 8/2012 | Mo et al. | |
| 2013/0002914 A1* | 1/2013 | Koyama | H04N 5/378 348/294 |
| 2013/0121455 A1* | 5/2013 | Koyama | H04N 5/3765 377/54 |
| 2016/0065868 A1 | 3/2016 | Olsen | |

* cited by examiner

CMOS IMAGE SENSOR WITH IMPROVED COLUMN DATA SHIFT READOUT

BACKGROUND OF THE INVENTION

Field of the Invention

This invention relates generally to image sensors, and more particularly to CMOS image sensors. The present invention provides an image sensor array and circuit design to increase column memory readout rate and reduce related electromagnetic interference (EMI) when very large pixel arrays are employed. An image sensor comprising the invented circuit design may be incorporated within a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an imaging system. Image sensors have become ubiquitous and may be found in a variety of electronic systems, for example a mobile device, a digital camera, a medical device, or a computer.

A typical image sensor comprises a number of light sensitive picture elements ("pixels") arranged in a two-dimensional array. Such an image sensor may be configured to produce a color image by forming a color filter array (CFA) over the pixels. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has led to pixel arrays becoming much larger in the number of pixels, but not much larger in overall area due to the use of narrower interconnect lines and smaller electronic components in the pixels and in the readout and control circuits. In addition to demands for higher resolution there are accompanying demands for higher image data readout rates. With the use of increased numbers of rows and columns of pixels, typical column readout circuits create larger and larger demands on power supplies resulting in the switching of larger and larger currents which result in unwanted EMI being incorporated into the image readout data stream. The components that make up a CMOS image sensor are extremely susceptible to transients caused by the power supply. A noisy power supply affects a pixel's ability to properly capture light, which results in a poor-quality image. Common noise sources are power supply ripple and fluctuation, electromagnetic interference (EMI), and substrate noise coupling. The larger and larger power supply demands also contribute to increased power consumption which trends opposite the added demand to reduce power drain on batteries in mobile devices. New approaches to image sensor circuit design are required to mitigate such effects.

Two of the most common methods for reading off the image signals generated on a sensor chip are the rolling shutter mode and the global shutter mode. Row select and row driver circuits as well as column bias circuits play a key role in executing either mode. The rolling shutter mode involves exposing different lines of the sensor array at different times and reading out those lines in a chosen sequence. The global shutter mode involves exposing each pixel simultaneously and for the same length of time, similar to how a mechanical shutter operates on a legacy "snapshot" camera. Prior art digital imaging systems have utilized either rolling shutter or global shutter readout modes. There are advantages, however, to having an imaging system which is capable of both readout modes, wherein the readout mode is selectable by the operator.

Rolling shutter (RS) mode exposes and reads out adjacent rows of the array at different times, that is, each row will start and end its exposure slightly offset in time from its neighbor. The readout of each row follows along each row after the exposure has been completed and transfers the charge from each row into the readout node of the pixel. Although each row is subject to the same exposure time, the row at the top will have ended its exposure a certain time prior to the end of the exposure of the bottom row of the sensor. That time depends on the number of rows and the offset in time between adjacent rows. A potential disadvantage of rolling shutter readout mode is spatial distortion, which results from the above. The distortion becomes more apparent in cases where larger objects are moving at a rate that is faster than the readout rate. Another disadvantage is that different regions of the exposed image will not be precisely correlated in time and appear as a distortion in the image. To improve signal to noise in the image signal final readout, specifically to reduce temporal dark noise, a reference readout called correlated double sampling (CDS) is performed prior to the conversion of each pixel charge to an output signal by an amplifier transistor. The amplifier transistor may typically be a transistor in a source-follower (SF) or common drain configuration wherein the pixel employs a voltage mode readout. However, there are advantages to incorporating a common source amplifier wherein the pixel employs a current mode readout. The common source amplifier may be used in large area imagers. The current of the photodiode is amplified, and the readout circuits integrate the current on a capacitor to a voltage, which is then converted to the digital domain.

Global shutter (GS) mode exposes all pixels of the array simultaneously. This facilitates the capture of fast-moving events, freezing them in time. Before the exposure begins, all the pixels are reset (RST) to the same ostensibly dark level by draining all their charge. At the start of the exposure each pixel begins simultaneously to collect charge and is allowed to do so for the duration of the exposure time. At the end of the exposure each pixel transfers charge simultaneously to its readout node. Global shutter mode can be configured to operate in a continuous manner whereby an exposure can proceed while the previous exposure is being readout from the readout storage nodes of each pixel. In this mode, the sensor has 100% duty cycle, which optimizes time resolution and photon collection efficiency. There is no artifact in the image of the period of transient readout that occurs in rolling shutter mode. Global shutter can be regarded as essential when exact time correlation is required between different regions of the sensor area. Global shutter is also very simple to synchronize with light sources or other devices.

Global shutter mode demands that a pixel contain at least one more transistor or storage component than a pixel using rolling shutter mode. Those extra components are used to store the image charge for readout during the time period following simultaneous exposure. Again in order to improve the signal to noise ratio in the image signal, a reference readout is required not only to be performed prior to the conversion of each pixel charge to an output signal by an amplifier transistor, but also prior to the transfer of the pixel charge to the extra components of the pixel used to store the image charge during readout.

In summary, rolling shutter can deliver the lowest read noise and is useful for very fast streaming of data without synchronization to light sources or peripheral devices. However, it carries a risk of spatial distortion, especially when imaging relatively large, fast moving objects. There is no risk of spatial distortion when using global shutter, and when synchronizing to fast switching peripheral devices it is relatively simple and can result in faster frame rates. Flexibility to offer both rolling shutter and global shutter can be very advantageous.

An opportunity for improvement of image sensors arises when certain components are employed to enhance their ability to increase the image data readout rate while reducing power consumption and electromagnetic interference that might normally accompany an increase in readout rate. The present invention fulfills these needs and provides further advantages as described in the following summary.

SUMMARY OF THE INVENTION

The present invention teaches certain benefits in construction and use which give rise to the objectives described below.

An image sensor comprises a pixel cell array comprising a plurality of rows and columns of pixels wherein the readout of the data placed on each column is converted to by an analog to data (ADC) circuit element into a binary coded datum held in a column memory circuit element. The invented column data readout circuit employs data shifting circuits and methods which result in increased data readout rates and reduced EMI.

A primary objective of the present invention is to provide an image sensor pixel having advantages not taught by the prior art.

An additional objective of the present invention is to provide pixel cell array column data readout circuits that increase the opportunity to use large pixel arrays at high frame rates with minimized electromagnetic radiation induced imaging signal degradation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor pixel cell array and accompanying column data readout circuits with readout rate increasing and EMI reduction circuit elements.

Various embodiments of the image sensor pixel cell are disclosed herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects. A substrate may have a front side and a back side. Any fabrication process that is performed from the front side may be referred to as a frontside process while any fabrication process that is performed from the back side may be referred to as a backside process. Structures and devices such as photodiodes and associated transistors may be formed in a front surface of a substrate. A dielectric stack that includes alternating layers of metal routing layers and conductive via layers may be formed on the front surface of a substrate.

Throughout the specification and claims, the following terms take the meanings explicitly associated herein, unless the context clearly dictates otherwise. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). The term "circuit" means either a single component or a multiplicity of components, either active or passive, that are coupled together to provide a desired function. The term "signal" means at least one current, voltage, or data signal. Should the invention involve a stacked chip arrangement, the front sides of two chips may be directly connected since the electrical interconnects on each chip will most commonly be formed on the front sides of each chip, or the front side of one chip may be directly connected to the backside of the second, which may employ through chip interconnects. Although circuit elements may be fabricated on the back side, when reference is made to certain circuit elements residing within or formed in a substrate, this is generally accepted to mean the circuits reside on the front side of the substrate.

Figure 1:
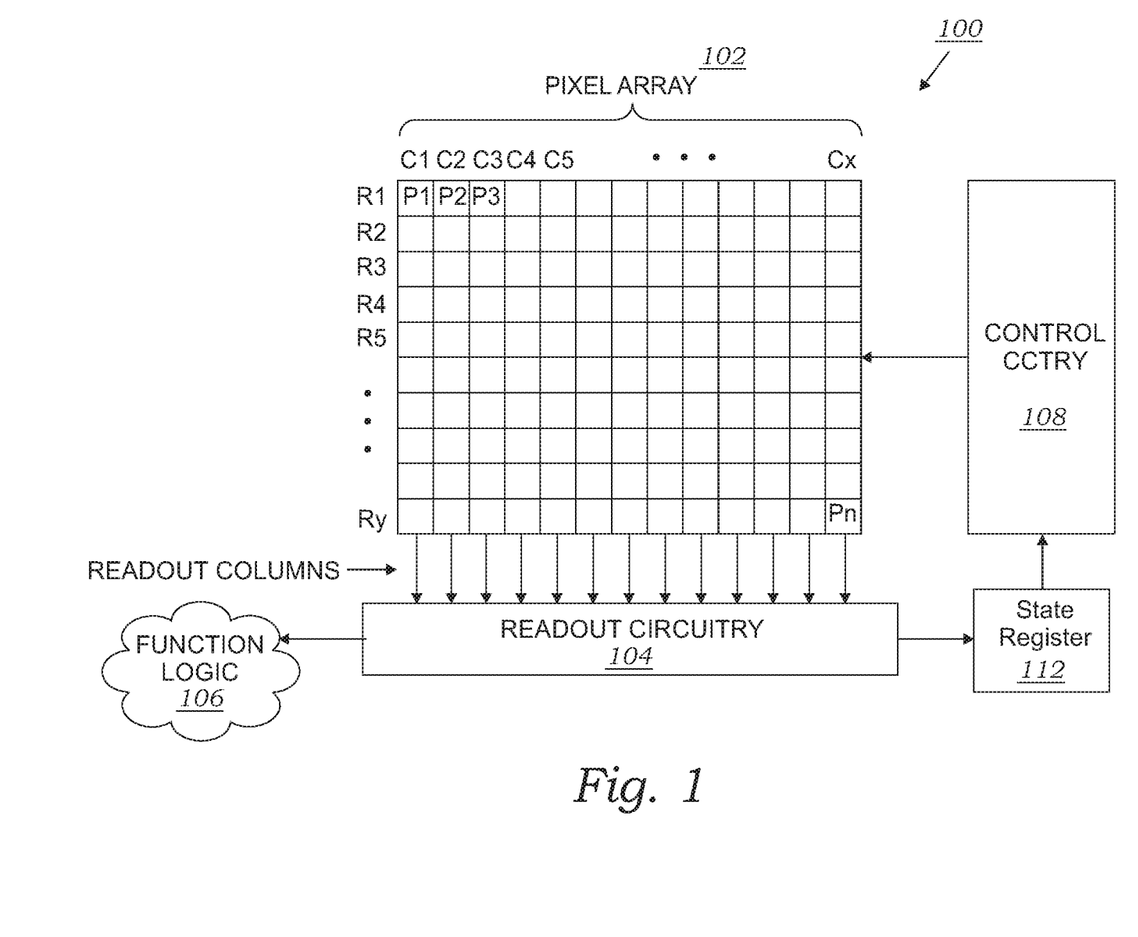
FIG. 1 is a diagram illustrating an imaging system including a pixel cell array having image sensor pixel cells included in an integrated circuit system, according to one embodiment of the present invention.

FIG. 1 is a diagram illustrating one example of an imaging system 100 including an example pixel array 102 having a plurality of image sensor pixels included in an example integrated circuit system with features in accordance with the teachings of the present invention. As shown in the depicted example, imaging system 100 includes pixel array 102 coupled to control circuitry 108 and readout circuitry 104, which is coupled to function logic 106. Control circuitry 108 and readout circuitry 104 are in addition coupled to state register 112. In one example, pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. In one example, after each pixel has acquired its image data or image charge, the image data is readout by readout circuitry 104 using a readout mode specified by state register 112 and then transferred to function logic 106. In various examples, readout circuitry 104 may include amplification circuitry, analog-to-digital (ADC) conversion circuitry, or otherwise. State register 112 may include a digitally programmed selection system to determine whether readout mode is by rolling shutter or global shutter. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated), or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 112. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
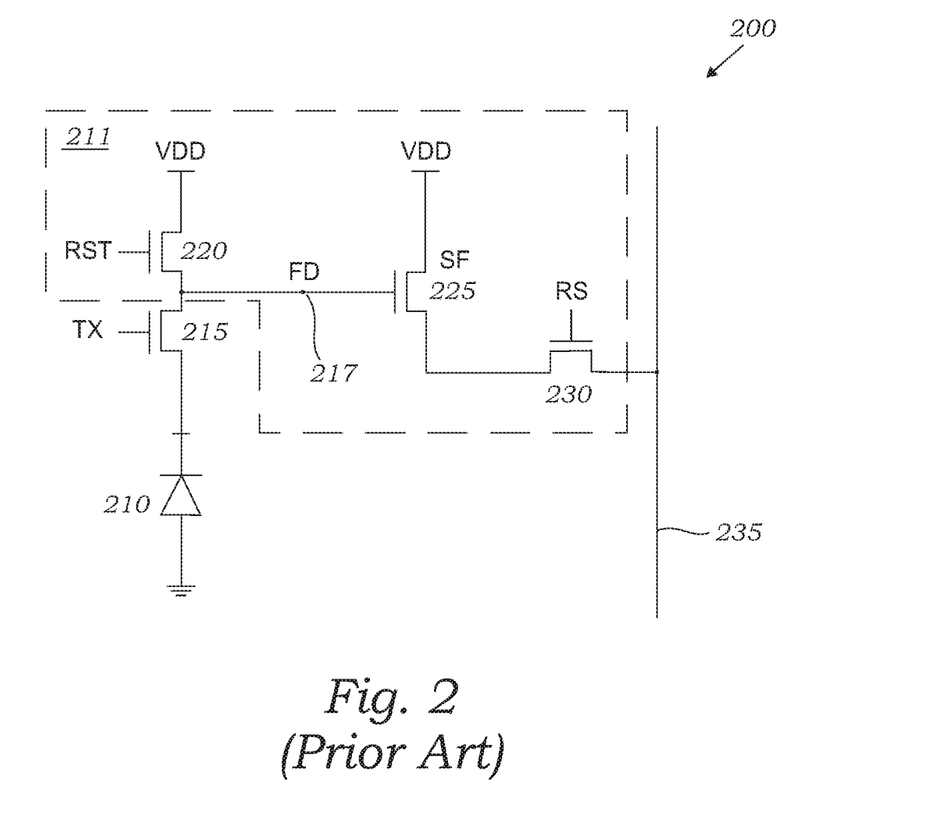
FIG. 2 is an electrical schematic that illustrates a prior art image sensor pixel cell with rolling shutter readout.

FIG. 2 is an electrical schematic that illustrates one example of an image sensor pixel cell 200 with rolling shutter readout found in the prior art. This figure and example pixel are provided to simplify explanation of pixel operation in anticipation of a description of an example of the present invention. Each sensor pixel 200 includes a photodiode 210 (e.g., photosensitive element) and pixel support circuitry 211 as shown. Photodiode 210 may be a "pinned" photodiode as is commonly present in CMOS image sensors. Photodiode 210 may be disposed on a sensor chip of a stacked die system, while pixel support circuitry 211 may be disposed on a separate circuit chip. In the example of FIG. 2, pixel support circuitry 211 includes a reset transistor 220, source follower (SF) amplifier transistor 225, and row select transistor 230 on a circuit chip coupled to a transfer transistor 215 and photodiode 210 on a sensor chip of a stacked die system as shown. An amplifier transistor in a source follower configuration is one in which the signal is input on the gate electrode and taken out on the source electrode. In another example, not shown, pixel support circuitry includes row select transistor 230 on a circuit chip coupled to a reset transistor 220, source follower (SF) transistor 225, transfer transistor 215 and photodiode 210 on a sensor chip of a stacked die system. During operation, photosensitive element 210 photo-generates charge in response to incident light during an exposure period. Transfer transistor 215 is coupled to receive a transfer signal TX, which causes transfer transistor 215 to transfer the charge accumulated in photodiode 210 to floating diffusion (FD) node 217. Floating diffusion 217 is in effect the drain of the transfer transistor 215 while the photodiode 210 is the source of transfer transistor 215. In one embodiment, transfer transistor 215 is a metal-oxide semiconductor field-effect transistor (MOSFET). Reset transistor 220 is coupled between power rail VDD and floating diffusion node 217 to reset sensor pixel 200 (e.g., discharge or charge floating diffusion node 217 and photodiode 210 to a preset voltage) in response to a reset signal RST. Floating diffusion node 217 is coupled to control the gate terminal of source-follower transistor 225. Source-follower transistor 225 is coupled between power rail VDD and row select transistor 230 to amplify a signal responsive to the charge on the floating diffusion FD node 217. Row select transistor 230 couples the output of pixel circuitry from the source-follower transistor 225 to the readout column, or bit line 235, in response to a row select signal RS. Photodiode 210 and floating diffusion node 217 are reset by temporarily asserting or enabling the reset signal RST and transfer signal TX. The accumulation period or accumulating window (e.g., exposure period) begins when the transfer signal TX is disabled, which permits incident light to photo-generate charge in photodiode 210. As photo-generated electrons accumulate in photodiode 210, its voltage decreases (electrons are negative charge carriers). The voltage or charge on photodiode 210 is representative of the intensity of the light incident on photodiode 210 during the exposure period. At the end of the exposure period, the reset signal RST is disabled, which turns off the reset transistor 220 and isolates floating diffusion FD node 217 from VDD. The transfer signal TX is then enabled to couple photodiode 210 to floating diffusion node 217. The charge is transferred from photodiode 210 to the floating diffusion FD node 217 through transfer transistor 215 which causes the voltage of floating diffusion FD node 217 to drop by an amount proportional to photo-generated electrons accumulated on photodiode 210 during the exposure period. The accumulation period or exposure window actually ends when the transfer transistor 215 is disabled, since the photodiode 210 is actually still accumulating charge while the transfer transistor 215 is enabled and transferring charge to the floating diffusion 217.

An important design metric in image sensors is dynamic range, which is defined as the logarithmic ratio between the largest non-saturating photocurrent and the smallest detectable photocurrent. For a sensor with a fixed saturation charge, also referred to as full well capacity, saturation limits the highest signal. Generally, the smallest detectable photocurrent is dominated by reset sampling noise of the photodiode 210 and the floating diffusion 217. Efforts to reduce the impact of reset sampling noise on dynamic range have relied on correlated double sampling (CDS). CDS is a technique of taking two samples of a signal out of the pixel and subtracting the first from the second to remove reset sampling noise. Generally, the sampling is performed once immediately following reset of the photodiode 210 and floating diffusion 217 and once after the photodiode 210 has been allowed to accumulate charge and transfer it to the floating diffusion 217. The subtraction is typically performed in peripheral circuitry outside of the pixel 200 and may increase conventional image sensor area although it may not increase pixel area. An image sensor utilizing a rolling shutter readout mode may incorporate CDS with only added peripheral circuit elements and no additional circuit elements in the pixel 200. An image sensor utilizing global shutter, however, may require multiple capacitors and transistors inside the pixel 200 which decreases the fill factor. It is advantageous to maintain reduced fill factor by partitioning the additional components required for CDS on to a circuit chip separate from and stacked on top of a sensor chip.

Figure 3:
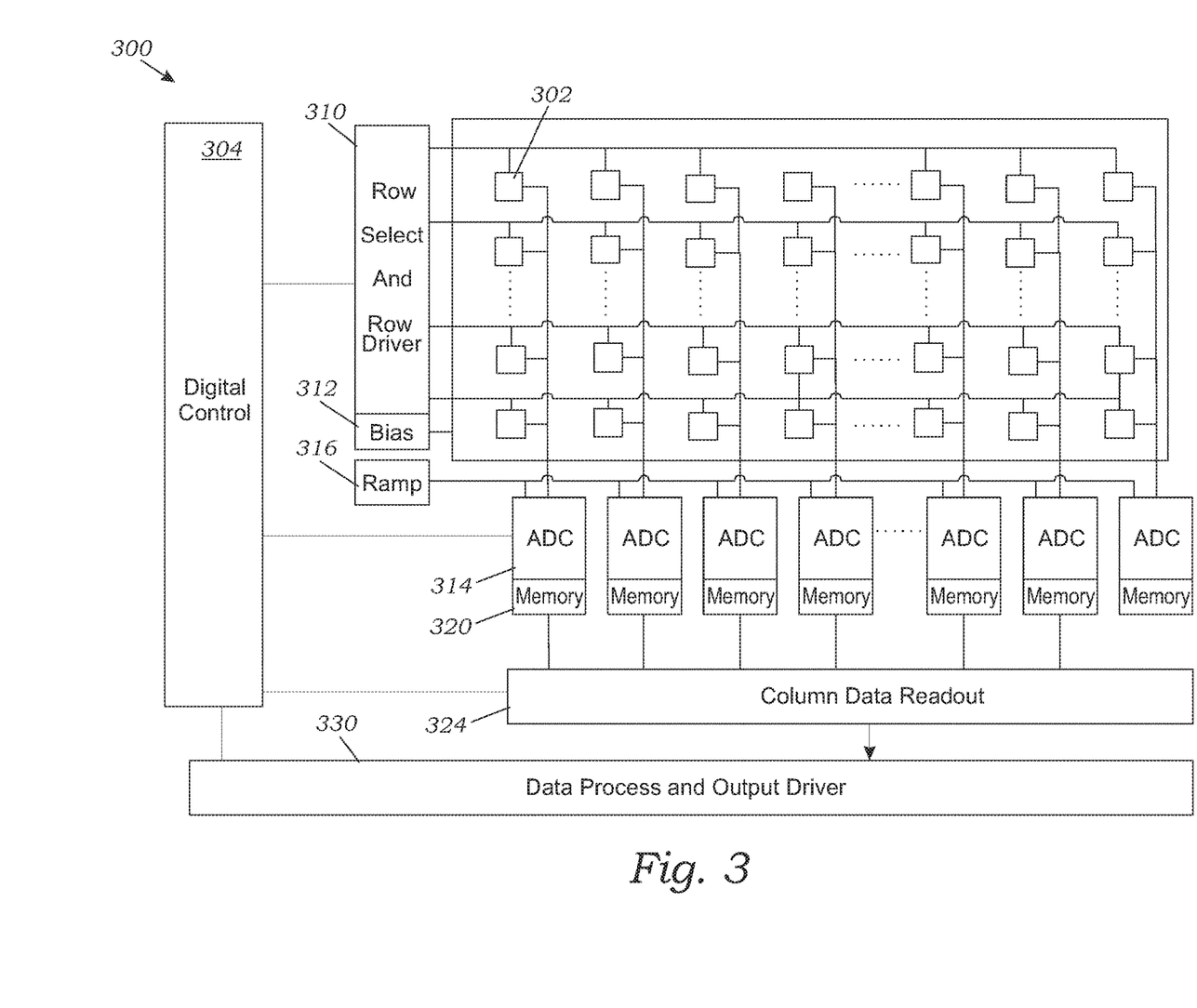
FIG. 3 is a diagram illustrating an image sensor functional blocks according to one embodiment of the invention.

FIG. 3 is a diagram illustrating an image sensor's functional blocks according to an embodiment of the invention. Imaging sensor 300 comprises pixel cells 302 arranged in rows and columns. Digital control circuit block 304 provides coordinated control signals to most of the functional blocks. Circuit block 310 contains row select and row driver circuits which are coupled to the array at the terminus of the rows and column bias circuit 312. Analog to digital conversion (ADC) circuits 314 are coupled to each pixel cell column to form a column parallel architecture. The column parallel architecture is an architecture of on-sensor chip analog to digital conversion circuit which enables higher frame rate. The pixel cells on each row share an ADC circuit 314 on each column. The ADC circuits 314 operate in parallel to convert the analog signals from one row of pixels at a time. There is an analog circuit portion to the ADC circuit 314 and it is sensitive to EMI. The parallel ADC operation enables a reduced clock rate to achieve a full image frame which may reduce EMI in the output. The analog circuit portion is typically a comparator which compares an input voltage with a centrally generated ramp voltage. The ramp voltage is supplied by supply 316 and its voltage spans the entire input range of the ADC 314. A central digital counter is running synchronously with the ramp voltage 316. When a column comparator detects that its input voltage equals the ramp voltage 316, it triggers a digital memory cell 320 implemented in each column circuit. This memory cell 320 then stores the counter value output by the central digital counter. The stored digital word may comprise M bits and is directly proportional to the input voltage of the column level ADC 314. The memory cell corresponding to and coupled to each column ADC 314 may typically be Random Access Memory (RAM). The bits stored in the RAM cell are then output on a readout bus to column data readout circuit 324 and then through data process and output driver 330.

The readout bus typically comprises multiple bit lines, so that multiple bits may be transferred simultaneously. For example, an M bit wide bus will consist of M parallel transfer lines, one to transfer each of M bits that describe an M bit word of data. Memory readouts times from memory cells such as RAM cells are very much shorter than pixel cell and row processing times. Typically, a half of a clock time is used to precharge bit lines of a readout bus, and another half of the clock time is used for reading signals from the memory cells 320 and sensing the signals by the sense amplifiers. Thus each memory operation takes, for example, only a few nanoseconds whereas pixel cell and row processing operations may take from 500 ns to several microseconds. Therefore, replacing pixel cell and row processing and the like operations with memory cell operations may enable decreased overall image transfer operations, i.e. increased frame rates.

Figure 4:
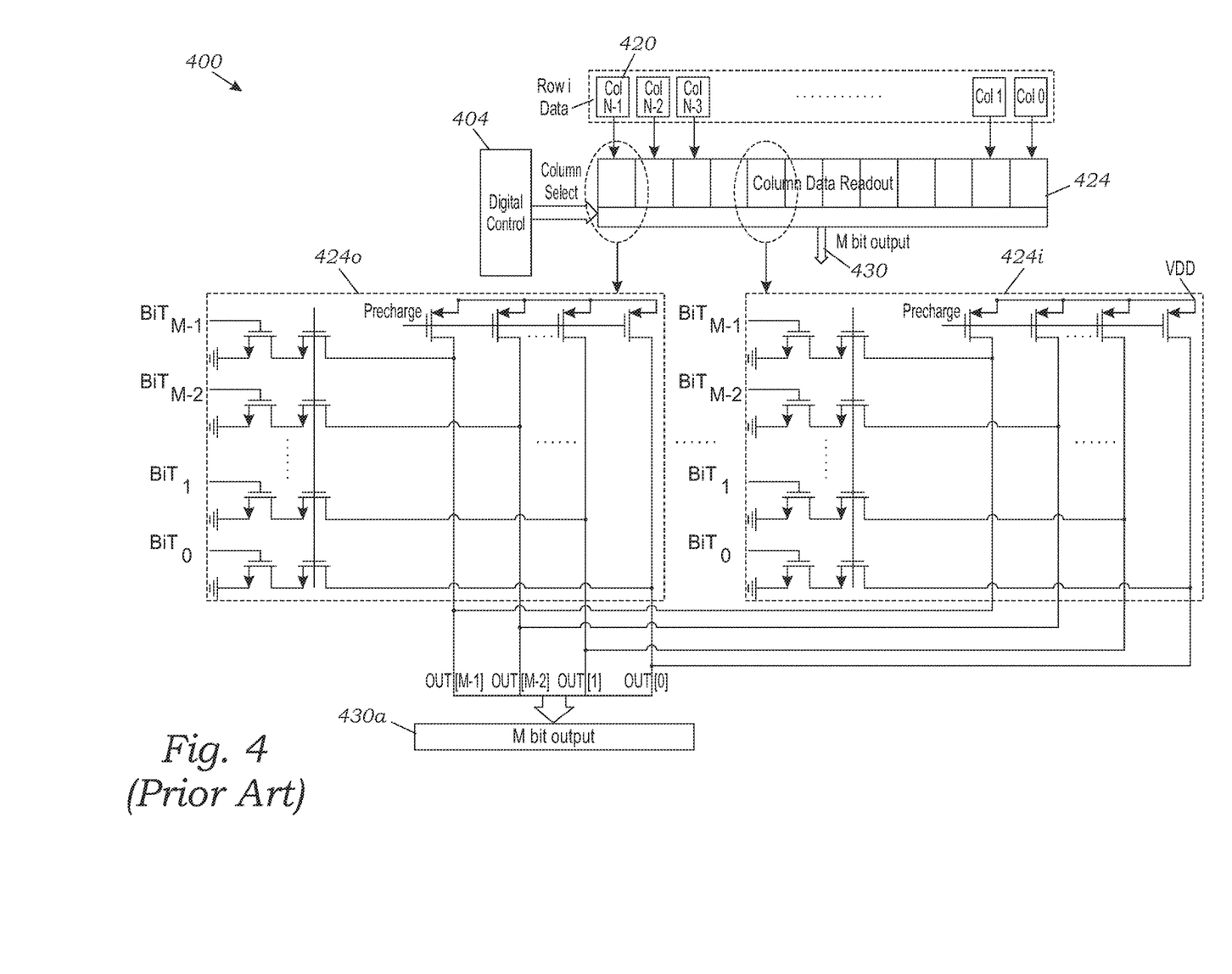
FIG. 4 is a diagram illustrating a prior art column data readout circuit.

FIG. 4 illustrates an example digital control and column data readout circuits 400 as found in the prior art and previously depicted in FIG. 3 components 304 and 324. N (a whole number) column data readout circuits 424 are controlled by digital control block 404 and supplied with data by N digital memory cells 420 associated with the ith row of the pixel cell array. Digital control block 404 selects the column to be read out. Example column data readout sub-circuits 424o and 424i are each dedicated to a memory cell 424 and its associated column. Sub-circuit 424o reads out memory data from column 0 while sub-circuit 424i reads out memory data from column i. Certain features however may limit frame rate and increase power consumption. Sub-circuits 424o and 424i contain one set of transistors and wiring for each of the M bits of the memory element. All of the N sets of M bit lines are merged at the M bit output bus 430 or 430a where N such M bit data words are output in sequence. This potentially large number of wires may limit circuit speed and thus frame rate. The large number of wires and transistors may require the use of large driver transistors whose operation may bring with them large drive currents and large power consumption. Switching large currents, such as when outputs are pre-charged high, also may generate large transient voltage spikes on the power supplies which may produce unwanted EMI.

Figure 5:
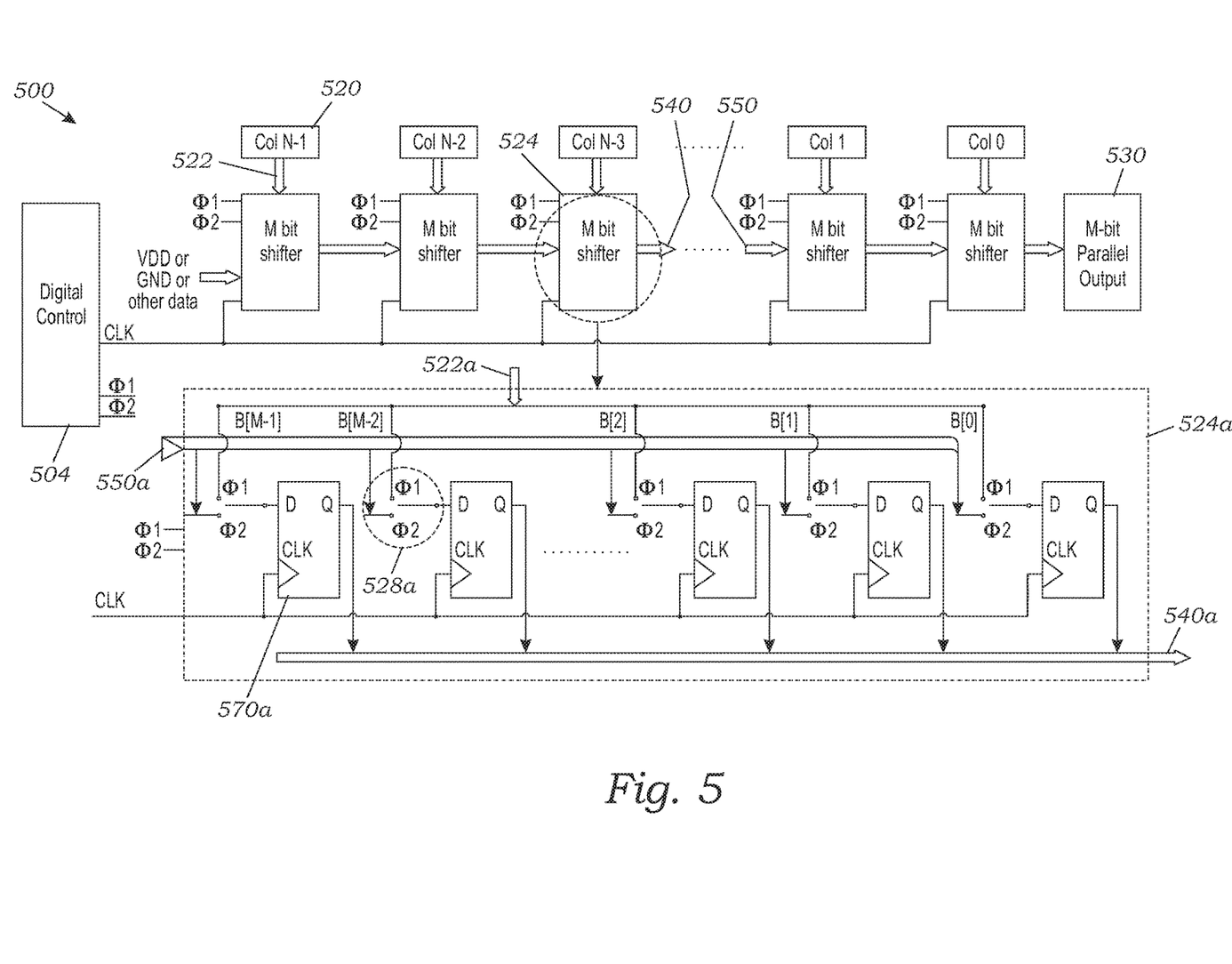
FIG. 5 is a diagram illustrating a column data readout circuit according to one embodiment of the invention.

An objective of the invention is to address these above mentioned limitations with a column data readout circuit configuration and method as illustrated in FIG. 5. FIG. 5 is a diagram illustrating a column data readout circuit 500 according to an embodiment of the invention. FIG. 5 shows N memory data cells 520 corresponding to N columns of an ith row of pixel cells in an array of pixel cells of an image sensor. Each memory data cell 520 provides M bit data words at input 522 to corresponding M bit data shifter circuits 524. Digital control circuit 504 simultaneously supplies a clock signal CLK to each M bit data shifter 524. Digital control circuit 504 also supplies two additional state signals $\Phi 1$ and $\Phi 2$ to simultaneously operate single pole double throw switches within each M bit data shifter 524. M bit data shifters 524 may also be supplied a supply voltage VDD or a ground connection GND or other input signals as needed. Each M bit data shifter 524 has an output 540 which serves as the input 550 to its adjacent M bit data shifter with the last output 540 from the M bit data shifter 524 associated with column 0 providing input to a data process and output driver circuit 530. Circuit 530 may be an M bit parallel output circuit or with the addition of a parallel to serial interface circuit (not shown) may be an M bit serial output.

FIG. 5 includes an expanded view 524a of M bit data shifter circuits 524 including illustrations of input 550a and output 540a as well as clock CLK and a single pole double throw (SPDT) switch 528a operated by state signals $\Phi 1$ and $\Phi 2$. The illustration of M bit data shifter circuit 524a shows M bit shifter circuits 570a each one processing in parallel simultaneously one of the M bits of an M bit data word from either input 522a or input 550a to output 540a. State signals $\Phi 1$ and $\Phi 2$ and their associated single pole double throw switch 528a establish two exclusive working states of the M bit data shifter circuits 524 with only one of the two signals, and therefore only one of the two switch options, enabled at a time. The common terminal of switch 528a is continually connected to the data input port D of bit shifter circuits 570a. When state signal $\Phi 1$ is enabled a first portion of single pole double throw switch 528a closes to connect the input of bit shifter circuits 570a to the M bits of an M bit data word from the memory cell, i.e. through 522a. When state signal $\Phi 2$ is enabled a second portion of single pole double throw switch 528a closes to connect the input of bit shifter circuits 570a to the M bits of an M bit data word from an adjacent M bit data shifter, i.e. through 550a. When $\Phi 1$ is enabled (ON) $\Phi 2$ is off and memory bit data is allowed to load through the first portion of switch 528a into the M bit shifters 570a from input 522a. Alternately, when $\Phi 2$ is enabled (ON) $\Phi 1$ is off and memory bit data in the M bit data shifter 524 is allowed to transfer through or shift between the M bit data shifter 524 using input 550a and the second portion of switch 528a. All of the M bit data shifters 524 are coordinated with clock CLK wherein the rising edge of clock CLK initiates the data shift operation. An alternative design choice would be to have the falling edge of clock CLK initiate the data shift operation.

The operating sequence begins with CLK, Φ1 and Φ2 in an off state. The first step is Φ1 becoming enabled, or its associated portion of the SPDT switch 528a closing, followed by CLK presenting a rising edge to initiate memory bit data transfers from column memories into the M bit data shifters 524. All the column data associated with the ith row of pixel cells is transferred at this time. The second step is Φ1 becoming disabled, or its associated SPDT switch 528a opening, followed by CLK presenting a falling edge. The third step is Φ2 becoming enabled, or its associated portion of the SPDT switch 528a closing, followed by CLK presenting a rising edge to initiate memory bit data transfers from one M bit data shifter 524 to an adjacent one. The fourth step is CLK presenting a falling edge followed by a rising edge to initiate another bit data transfer from one M bit data shifter 524 to an adjacent one. The fourth step is repeated until all of the data associated with the ith row of pixel cells is transferred out of the M bit data shifters 524 and through the M bit parallel output. N data transfers are required to output all the data associated with the ith row of pixel data while Φ2 is enabled. Once all of the data originally loaded into the M bit data shifters 524 from the column memory representing imaging pixel row I is transferred to M bit parallel output 530 then Φ2 is disabled, or its associated SPDT switch 528a is opened.

Bit shifter circuits 570a may each comprise a "D flip flop" (DFF) which will store and output whatever logic level is applied to an input data terminal so long as the clock input is HIGH and once the clock input goes LOW it will not change state and store whatever data was present on its output before the clock transition occurred.

All of the components of M bit data shifter 524 are digital logic gates which consume less power and may operate at increased frame rate compared to the partially analog circuits shown in prior art component 424 of FIG. 4.

Figure 6:
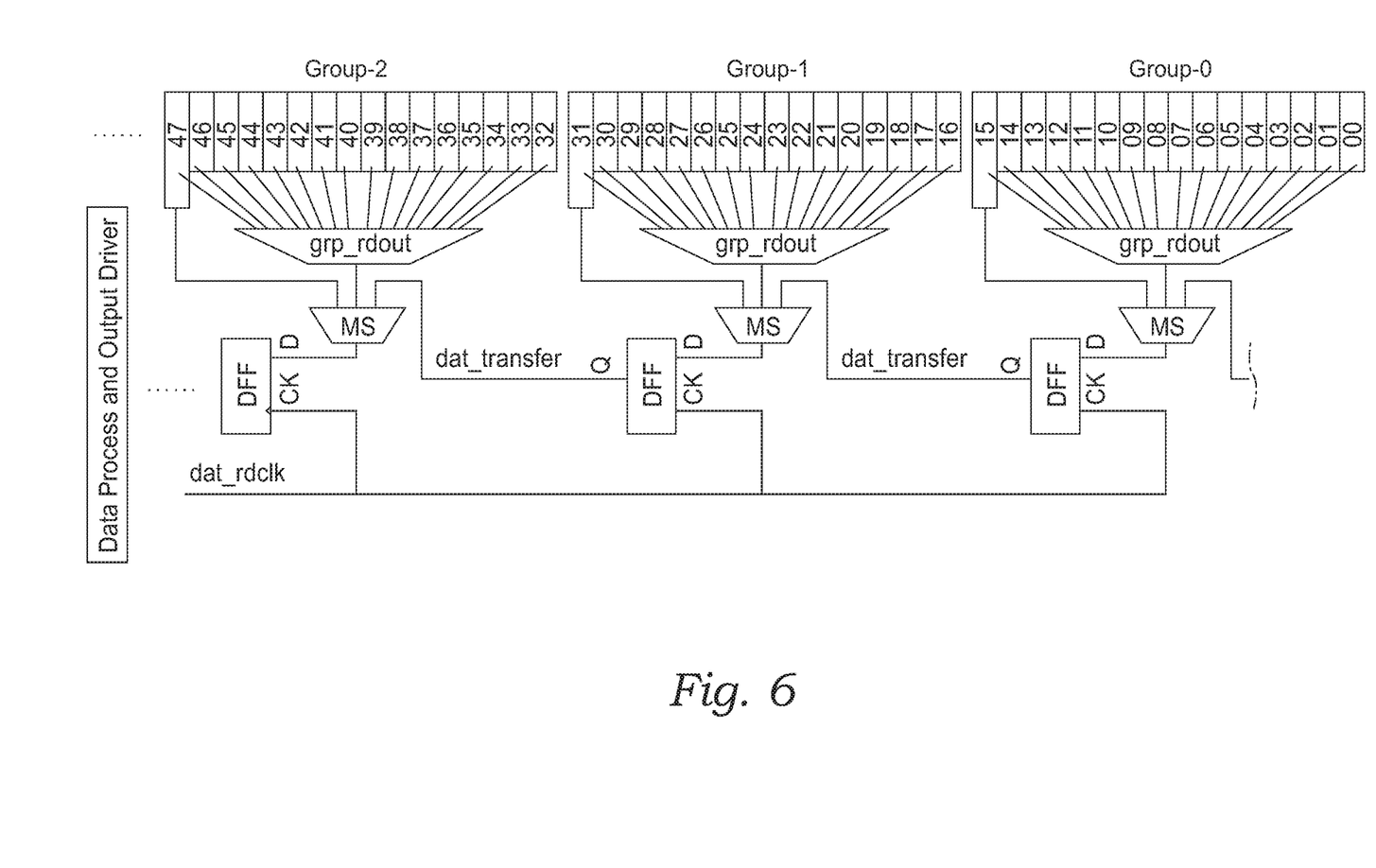
FIG. 6 is a block diagram illustrating a column data readout circuit according to an embodiment of the invention wherein memory columns are grouped prior to readout.

1. FIG. 6 is a block diagram illustrating a column data readout circuit according to an embodiment of the invention wherein memory columns are grouped prior to readout. FIG. 6 illustrates the first three groups (Group-0, Group-1, Group-2) of a number of groups representing an imaging array wherein each group shares an M-bit shifter (DFF) and wherein data is readout by transferring the data along the line dat_ transfer through the shifters and off of the array. Data from the groups is transferred through a group readout circuit (grp_rdout) and a multiple switch circuit (MS) into the M-bit shifters DFF at port D. The M-bit shifters transfer their data when triggered by at clock port CK as determined by a data read clock (dat_rdclk). FIG. 6 illustrates groupings of 16 columns but groupings of 2, 4, 8 or any whole number multiple of 2 are contemplated as well as groupings based on other convenient numbers of columns. Alternatively the number of adjacent digital memory circuits forming on group is $2^X$ wherein X is a whole number.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top", "down", "above", "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An imaging sensor comprising: a pixel array having a plurality of imaging pixel sensor cells arranged in a number H horizontal rows and a number N vertical columns, pixel cell data being read out on N column lines of the array through the action of control signal circuits;
    a separate analog-to-digital conversion (ADC) circuit coupled on an input side to each column line and on an output side to a separate M-bit wide digital memory circuit, pixel cell data being stored on each memory circuit representing pixel cell data output from each column line;
    a column data readout circuit comprising N M-bit data shifters, each M-bit data shifter having an M-bit wide output, and single pole double throw (SPDT) switches whose common terminals provide inputs to the M-bit data shifters, wherein a first switch state of the SPDT switches connects the input of their associated M-bit data shifters to their associated M-bit wide digital memory circuits and wherein a second switch state of the SPDT switches connects the input of their associated M-bit data shifters to an M-bit wide output bus from an adjacent M-bit data shifter;
    an M-bit parallel data process and output driver circuit coupled to the M-bit data shifter associated with the last array column to output pixel cell data from the imaging sensor and wherein employing these components may enable the imaging sensor to consume reduced power and to generate reduced electromagnetic interference and to operate at increased frame rate.

2. The imaging sensor of claim 1 wherein the M-bit data shifter associated with the first array column comprises an associated SPDT switch wherein the second switch state provides no data input.

3. The imaging sensor of claim 2 wherein each of the M bit shifters comprise a "D flip flop" which will store and output whatever logic level is applied to an input data terminal so long as the clock input is HIGH and once the clock input goes LOW it will not change state and store whatever data was present on its output before the clock transition occurred.

4. A method to achieve image readout with the imaging sensor as recited in claim 2 with an increased frame rate with reduced electromagnetic interference and reduced power consumption having a sequence of transfer modes comprising the steps of:
   storing a representation of each pixel cell of a row of pixels as M-bit data words in a row of M-bit column memory circuits;
   closing the first switches of the SPDT switches and upon the rising edge of a timing clock transferring the M-bit data words into the M bit shifters of the M-bit data shifter circuits and then opening the first switch; and
   closing the second switch of the SPDT switches and upon the next and subsequent rising edges of the timing clock transferring the M bit shifters of the M-bit data words from each M-bit data shifter circuit to the adjacent M-bit data shifter until all the data loaded into the M-bit data shifters, when the first switch was closed, is transferred out through the M-bit parallel data process and output driver circuit.

5. The imaging sensor of claim 4 wherein the number of adjacent digital memory circuits coupled to a single group readout circuit is 8 or a whole number multiple of 2 greater than 8 and less than 1024.

6. The imaging sensor of claim 4 wherein the number of adjacent digital memory circuits coupled to a single group readout is $2^X$ wherein X is a whole number between 3 and 10.

7. The imaging sensor of claim 1 wherein each M-bit data shifter comprises M bit shifters in a parallel circuit configuration wherein each bit shifter comprises a connected single pole double throw (SPDT) switch whose common terminal provides an input to the bit shifter and wherein a first switch state of the SPDT switch connects the input of its associated bit shifter to an associated similar bit line of the M-bit wide digital memory circuit and wherein a second switch state of the SPDT switch connects the input of its associated bit shifter to an associated similar bit line of the M-bit wide output bus from an adjacent M-bit data shifter.

8. The imaging sensor of claim 1 also comprising a timing clock used to coordinate the transfer of imaging data among the M-bit data shifters.

9. A method to achieve image readout with the imaging sensor as recited in claim 1 with an increased frame rate with reduced electromagnetic interference and reduced power consumption having a sequence of transfer modes comprising the steps of: storing a representation of each pixel cell of a row of pixels as M-bit data words in a row of M-bit column memory circuits; closing the first switch of the SPDT switches and upon the rising edge of a timing clock transferring the M-bit data words into the M-bit data shifter circuits and then opening the first switch; and closing the second switch of the SPDT switches and upon the next and subsequent rising edges of the timing clock transferring the M-bit data words from each M-bit data shifter circuits to the adjacent M-bit data shifter until all the data loaded into the M-bit data shifters when the first switch was closed is transferred out through the M-bit parallel data process and output driver circuit.

10. An imaging sensor comprising: a pixel array having a plurality of imaging pixel sensor cells arranged in a number H horizontal rows and a number N vertical columns, pixel cell data being read out on N column lines of the array through the action of control signal circuits;
   a separate analog-to-digital conversion (ADC) circuit coupled on an input side to each column line and on an output side to a separate M-bit wide digital memory circuit, pixel cell data being stored on each memory circuit representing pixel cell data output from each column line; a number of group readout circuits each coupled to a number of adjacent digital memory circuits and each group readout circuit capable of transferring out digital memory data from each of the number of memory circuits, wherein the number of group readout circuits is sufficient to read out all of the N column lines of the array;
   a column data readout circuit comprising M-bit data shifters, one coupled to each of the group readout circuits, and single pole double throw (SPDT) switches whose common terminals provide inputs to the M-bit data shifters, wherein a first switch state of the SPDT switches connects the input of their associated M-bit data shifters to their associated group readout circuit and wherein a second switch state of the SPDT switches connects the input of their associated M-bit data shifters to an M-bit wide output bus from an adjacent M-bit data shifter;
   an M-bit parallel data process and output driver circuit coupled to the M-bit data shifter associated with the last array column to output pixel cell data from the imaging sensor and wherein employing these components may enable the imaging sensor to consume reduced power and to generate reduced electromagnetic interference and to operate at increased frame rate.

* * * * *